(12) United States Patent
MacDonald

(10) Patent No.: US 10,814,940 B2
(45) Date of Patent: Oct. 27, 2020

(54) BOARD, WATERCRAFT OR OTHER VEHICLE BODY

(71) Applicant: DMS Composites Pty Ltd, Currumbin (AU)

(72) Inventor: Daniel Pene MacDonald, Currumbin (AU)

(73) Assignee: DMS COMPOSITES PTY LTD, Currumbin (AU)

( * ) Notice: Subject to any disclaimer, the term of this patent is extended or adjusted under 35 U.S.C. 154(b) by 0 days.

(21) Appl. No.: 16/412,980

(22) Filed: May 15, 2019

(65) Prior Publication Data

US 2019/0351979 A1    Nov. 21, 2019

(30) Foreign Application Priority Data

May 15, 2018  (AU) ................................ 2018901670

(51) Int. Cl.
*B63B 32/50*    (2020.01)
*B33Y 80/00*    (2015.01)

(52) U.S. Cl.
CPC .............. *B63B 32/50* (2020.02); *B33Y 80/00* (2014.12)

(58) Field of Classification Search
CPC ........................... B63B 35/7906; B33Y 80/00
See application file for complete search history.

(56) References Cited

U.S. PATENT DOCUMENTS

| | | | | |
|---|---|---|---|---|
| 6,623,323 B1* | 9/2003 | Mead | ................... | B29C 66/636 441/74 |
| 7,435,150 B2* | 10/2008 | Mehiel | ................... | B63C 11/02 114/357 |
| 7,582,238 B1* | 9/2009 | Yomazzo | .............. | B29C 44/445 264/45.7 |
| 7,845,999 B2* | 12/2010 | Conner, Jr. | ............. | B32B 15/20 441/74 |
| 7,963,815 B2* | 6/2011 | Mead | ..................... | B63B 73/74 441/74 |
| 8,702,462 B1* | 4/2014 | Klokow | .................. | B63B 32/50 441/65 |
| 2005/0184432 A1* | 8/2005 | Mead | .................... | B29C 33/307 264/272.15 |
| 2007/0218787 A1* | 9/2007 | Carter | ..................... | B63B 32/50 441/74 |
| 2008/0280096 A1* | 11/2008 | Metrot | ...................... | B32B 5/18 428/127 |
| 2009/0165697 A1* | 7/2009 | Caldwell | ................. | B63B 32/50 114/65 R |
| 2010/0240271 A1* | 9/2010 | Mann | ..................... | B63B 32/50 441/74 |
| 2014/0024272 A1* | 1/2014 | Barron | ................... | B63B 32/50 441/74 |
| 2017/0190394 A1* | 7/2017 | Cheung | ...................... | B32B 5/06 |
| 2019/0351979 A1* | 11/2019 | MacDonald | ........... | B33Y 80/00 |

* cited by examiner

*Primary Examiner* — S. Joseph Morano
*Assistant Examiner* — Jovon E Hayes
(74) *Attorney, Agent, or Firm* — Parker Highlander PLLC

(57) ABSTRACT

A board suitable for riding a wave is described. The board includes interconnected deck and bottom reinforcing zones.

19 Claims, 6 Drawing Sheets

BOARD, WATERCRAFT OR OTHER VEHICLE BODY

This application claims benefit of priority to Australian Application No. 2018901670, filed May 15, 2018, the entire contents of which are hereby incorporated by reference.

TECHNICAL FIELD

The present technology relates generally to boards. It finds particularly effective application in surfboards for riding waves. The technology also finds effective application in other technical areas such as watercraft, landboards, skateboards, skis, dune boards, skim boards, kiteboards, but also to other vehicle bodies such as go-karts, cars, and the like.

BACKGROUND

The stresses on a board or watercraft or vehicle body in use are rapidly-changing and complex, depending on manoeuvres that the board is driven to perform.

Turning to a surfing application, it is known that surfboards plane on a wave that is close to breaking. Professional surfers and even skilled amateurs demand a board that is strong, light and flexible. These highly skilled users make high performance board riding look easy, and much can be attributed to an individual's skill, but at least a portion of the high performance is due to a board that can deliver drive, momentum and flex in the right places, responding to foot and body inputs at the right times and in the right ways.

It is difficult to obtain this balance between resisting and permitting torsion and bending forces at the right times without breaking the blank or simply being too heavy and cumbersome.

The present inventor seeks to provide a new board, watercraft or vehicle body which seeks to ameliorate one or more of the above disadvantages or at least make a new board, watercraft or vehicle body which is new.

SUMMARY

Broadly, the present technology provides a board suitable for riding a wave, the board including interconnected deck and bottom reinforcing zones.

Broadly, the present technology provides a board suitable for riding a wave, the board including one or more interconnected deck and bottom reinforcing elements.

Broadly, the present technology provides a board suitable for riding a wave, the board including one or more deck reinforcing zones and one or more bottom reinforcing zones, wherein reinforcing material is disposed on or near the one or more deck and bottom reinforcing zones, the one or more deck and bottom reinforcing zones being connected by reinforcing material which extends through the board between the deck and the bottom.

Broadly, the present technology provides a board suitable for riding a wave, the board including a tail reinforcing zone, and a forward reinforcing zone disposed forward of the tail, the tail and forward reinforcing zones being disposed on opposing faces, the reinforcing zones comprising reinforcing material disposed thereon or therein, and interconnected by reinforcing material.

The arrangement of some embodiments is generally such that the reinforcing zones comprise a broad area of the deck or bottom surface.

Some embodiments include reinforcing zones on the midline of the board.

Some embodiments include reinforcing zones distal the midline of the board.

Some embodiments include reinforcing zones both on the midline and also distal the midline of the board.

Some embodiments include an arrangement where one reinforcing zone is on one face, on the midline of the board, and an interconnected reinforcing zone on an opposite face, is also on the midline.

Some embodiments include an arrangement wherein one reinforcing zone is on one face, distal the midline of the board, and an interconnected reinforcing zone on an opposite face, is also distal the midline.

Some embodiments include one reinforcing zone on the midline, and an interconnected reinforcing zone on an opposite face distal the midline of the board.

Broadly, the present technology provides a watercraft or vessel or vehicle body, which includes a rear reinforcing zone and a forward reinforcing zone, disposed on opposite sides of a watercraft of vessel or vehicle body wall, and interconnected by reinforcing material.

The interconnecting reinforcing material may be the same reinforcing material that provides reinforcing to the wall or board in the reinforcing zones, or it may be a second reinforcing material that is different from the first, in thickness, composition, dimension, or other characteristic.

In accordance with a first aspect of the present technology there is provided a board or watercraft or vessel or vehicle body which includes one or more deck reinforcing zones disposed in or on a deck, and one or more bottom reinforcing zones disposed in or on a bottom face, the deck reinforcing zone and bottom reinforcing zones including one or more elements of reinforcing material disposed on or in a face of the deck and bottom, wherein the deck reinforcing zone and the bottom reinforcing zones are interconnected by an interconnecting reinforcing element extending through the board or watercraft or vessel between the deck and the bottom.

In accordance with another aspect of the present technology there is provided a method of manufacture of a board or watercraft, the method including the steps of: providing a board blank;

cutting an aperture between a deck and a bottom face;
threading a reinforcing element through the aperture;
fastening the reinforcing element to, or in, the deck and bottom face.

In accordance with yet another aspect of the present technology there is provided a method of manufacture of a board or watercraft, the board or watercraft having a deck and a bottom, the method including the steps of:

printing a reinforcing element onto a board blank, the reinforcing element extending from the deck of the board to the bottom of the board.

In one embodiment the one or more elements of reinforcing material are connected together by the interconnecting reinforcing element.

In one embodiment the reinforcing zones are disposed on a surface of the wall and are arranged over a broad area of the board face.

In one embodiment of the technology the one or more reinforcing zones are disposed on a broad area over a portion of the board.

The reinforcing zone in some embodiments is facilitated by reinforcing material disposed on a surface such as the deck or bottom face or one or other side of the wall of the vehicle body or craft body.

The reinforcing zone in some embodiments is facilitated by reinforcing material disposed in the blank of the board.

The reinforcing material may be disposed near or adjacent the surface of the deck or bottom face, or on the surface. Practically speaking that may mean that the reinforcing material is set into the blank or onto the blank.

The reinforcing material may in some embodiments then be covered by a resin layer and/or a glass fabric layer for supplementary structural support.

In one embodiment the reinforcing material may be rods or rovings of a selected cross section. That is, it may be cylindrical rods, square section rods or other kinds of rods. The roving may be straps, battens, which may be flatter in section. The straps or battens may be flexible even though they may be flat rectangles in section. The straps or battens may be rigid and made from steel, stainless steel, titanium, aluminium or magnesium, plastic, natural material such as wood, balsa, or bamboo, or other suitable elements.

The reinforcing material may be webbing or tape elements.

In one embodiment the elements of reinforcing material are integral with the interconnecting reinforcing element. In one embodiment there is a single reinforcing tape element disposed on or in the deck face, extending through the board and interconnecting with the bottom face to reinforce the board blank.

In one embodiment the tape element is carbon fibre webbing or tape. Other suitable tapes may be used as reinforcing material.

In one embodiment the reinforcing zone includes at least one carbon fibre tape element extending from a tail region to a nose region.

In one embodiment, at a selected point between tail and nose, an aperture or affordance is provided between the deck and the bottom, or from one side of a wall to another side, to allow interconnecting reinforcing material to extend from one face or side to another.

It is to be understood that the deck or bottom reinforcing material could be joined by the interconnecting reinforcing material or the reinforcing material and interconnecting reinforcing material could be one integral length of reinforcing material.

It is also to be understood that the board may be assembled in pieces and laid together so that there would be no aperture formed for receiving an integral length of the reinforcing material, but rather, an assembly of pieces wherein a reinforcing tape element would be laid between pieces. That is, although in one embodiment, there is contemplated one single blank element or wall element into which an aperture is formed for the injection and receipt of a tape reinforcing element which extends from one side to another of a blank or wall, other suitable methods are contemplated which may have a similar effect.

In one embodiment the entire board could be printed by an additive manufacturing process. The additive manufacturing process could be by way of an SLS machine, or 3D printer with filaments deposited by a head configured to move across a surface, or any other suitable additive manufacturing process. In one embodiment the additive manufacturing process can print different densities and materials, so that the reinforcing elements could be printed by a different head, but at the same time as the blank.

In one embodiment the aperture extends on a pathway directly on the shortest route from one side of the blank or wall to the other.

The aperture may vertically extend from the deck to the bottom face to save material.

The aperture may diagonally extend from the deck to the bottom face to reduce stresses on the reinforcing element or blank.

The aperture in some embodiments could extend between the deck and the bottom faces by a part-sinusoidal, asymptotic, curved pathway, or other suitable pathway to further reduce stresses introduced to the blank or the reinforcing material by sudden and sharp corners or angles.

In one embodiment the aperture is disposed at a position adjacent the fins. That is, the arrangement in that embodiment is such that the reinforcing elements on the tail reinforcing zone are disposed only on the tail region. In that embodiment the reinforcing element turns to extend from the deck to the bottom through an angled aperture just outside the tail region where one foot of the rider stands in a normal riding position.

In other embodiments the aperture is disposed at an intermediate position between the tail and the nose. Any suitable location is contemplated, depending on the change in performance characteristics desired.

In one embodiment the aperture extends at an angle between the deck and the bottom face, or between the two wall faces. The angle may be 45 degrees, or it may be 10, 15, 20, 25, 30, 35, 40, 50, 55, 60, 65, 70, 75 or 80 degrees from the deck and bottom faces, depending on the application.

The aperture may draw the reinforcing element on a curved path. The curved path may extend around the board, when viewed in plan view, to alter the twist-resistance profile of the blank.

The reinforcing element may take a direct path along the blank to the nose (notwithstanding that it traverses the aperture from one side of the blank to the other).

The reinforcing element may take a curved path along the blank.

The reinforcing element may follow a similar pathway as that of the rail, and may be proximal to the rail, or spaced therefrom.

In one embodiment the reinforcing element is spaced a selected distance from the rail, following a similar arc thereto.

In one embodiment a single reinforcing element is provided.

In one embodiment there may be provided a single reinforcing element, disposed along the midline of a surf, kite, skate, or other kind of board.

In one embodiment a single reinforcing element is provided, either integral or connected (joined) at one or both ends.

In one embodiment a single reinforcing element is provided (either integral or in pieces, connected together), the reinforcing element having one end being disposed on the deck in a left corner near the tail, the reinforcing element extending along a curved pathway along the port side of the board, spaced a selected distance from the midline and from the rail, extending through an angled aperture from one side to the other, and towards a nose region, and then returning along a similar path along the starboard side.

The reinforcing element may form a mat on the deck.

The reinforcing element may form a reinforcing zone by having two spaced reinforcing tape elements spaced apart from one another and adjacent the rail. The reinforcing elements in the reinforcing zone may be of any suitable geometric shape, including elongate tape elements, circular pads, triangles, anything suitable.

The reinforcing elements may be spaced from the midline of the blank but also spaced from the rail, depending on the amount of twist and resistance to twist required.

The reinforcing elements may be spaced from the nose, depending on the amount of resistance to bending forces required from the board.

The reinforcing elements may be spaced from the midline of the blank.

The board may include one, two, three, four, five, six, seven, eight, nine, ten, or any suitable number of reinforcing elements which may be laterally spaced-apart across the board, so as to alter the twist and bending performance of the board blank.

The reinforcing elements may be any width, from 1, 2, 3, 4, 5, 6, 7, 8, 9, 10, 15, 20, 25, 30, 35, 40, 45, 50, 55, 60, 65, 70, 75, 80, 85, 90 or 100 mm or any suitable width.

The width of the reinforcing elements may vary along the tape element.

The width of the reinforcing elements may be narrower through the aperture to change the stress concentration in the tape elements.

In one embodiment, one reinforcing element may extend from deck to bottom, while other reinforcing elements may extend from bottom to deck in the same reinforcing region. This provides a sandwich effect, which adds additional stiffness to the board, without increasing twist resistance.

In one embodiment there may be provided two reinforcing elements, joined together at the nose and/or the tail. There may be three, four, five, six, seven eight, nine, ten, twelve, fifteen, twenty or any suitable number of reinforcing elements.

Advantages

Advantageously, the arrangement of the reinforcing elements in the board provide the feeling of extra drive and momentum, creating a free-flowing lively ride.

Advantageously, the arrangement of the reinforcing elements in the board provides less resistance to torsional flex allowing the board to flow through turns with a broader turning radius.

In this specification, where a document, act or item of knowledge is referred to or discussed, this reference or discussion is not an admission that the document, act or item of knowledge or any combination thereof was at the priority date:

(a) part of common general knowledge; or
(b) known to be relevant to an attempt to solve any problem with which this specification is concerned.

It is to be noted that, throughout the description and claims of this specification, the word 'comprise' and variations of the word, such as 'comprising' and 'comprises', is not intended to exclude other variants or additional components, integers or steps.

In order that the present technology may be more clearly understood, preferred embodiments will be described with reference to the following drawings and examples

BRIEF DESCRIPTION OF THE DRAWINGS

In order to enable a clearer understanding, a preferred embodiment of the technology will now be further explained and illustrated by reference to the accompanying drawings, in which.

DETAILED DESCRIPTION OF AN EXAMPLE EMBODIMENT

Figure 1:
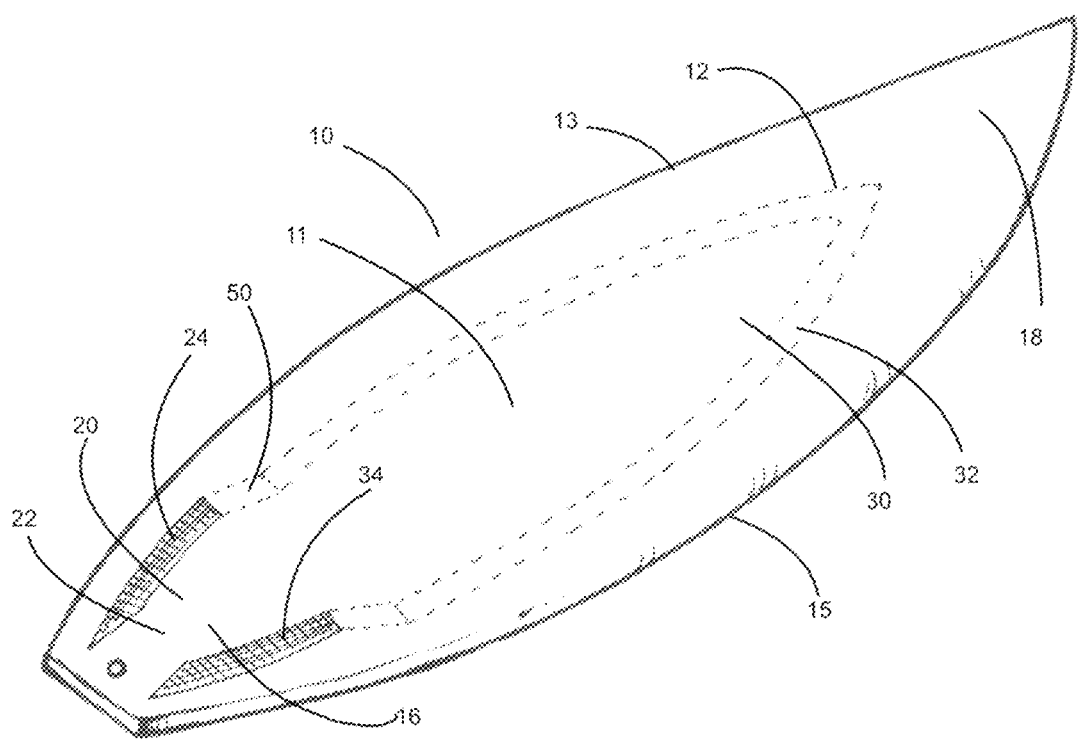
FIG. 1 is an isometric view of a board from above which has reinforcing zones on the deck at the tail region and a reinforcing region on the main bottom portion including the nose region.

Referring to the drawings there is shown a board suitable for riding a wave generally indicated at 10. The board 10 has a blank 11, a deck 12, a bottom face 14, a tail 16, and a nose 18 and rails 13, 15. There is a resin/glass weave layer 17 for structural support and sealing for the blank 11.

The board 10 includes a deck reinforcing zone 20 and a bottom reinforcing zone 30, interconnected with one another by interconnecting reinforcing elements 40.

The interconnecting reinforcing elements 40 extend through the board 10 through aperture 50 to connect the deck reinforcing zone 20 and the bottom reinforcing zone 30, and transfer the forces therebetween.

The deck reinforcing zone 20 could also be considered a tail reinforcing zone 22 and the bottom reinforcing zone 30 could also be considered a nose reinforcing zone 32.

The arrangement of the embodiment shown is such that the reinforcing zones 20, 22, 30, 32 comprise a broad area of the deck or bottom surface, distal the midline of the board.

The interconnecting reinforcing material 40 is the same reinforcing material 24, 34 that provides reinforcing to the board in the reinforcing zones 20, 30. In the embodiments shown that material 40 is a reinforcing tape.

In one embodiment of the technology the reinforcing zones 20, 30 are disposed on a broad area over a portion of the board 10. The reinforcing zone 20, 30 is facilitated by reinforcing material 24 (deck, port), 34 (bottom, starboard) disposed on or adjacent their respective surfaces.

The reinforcing material 24, 34 is covered by the resin and glass fabric layer 17 for supplementary structural support.

The reinforcing material 24, 34, 40 is in the form of webbing or tape elements, and in the embodiment shown, they are carbon fibre webbing or tapes.

At a selected point between tail and nose, an aperture 50 is provided between the deck and the bottom, to allow interconnecting reinforcing material to extend from one face or side to another. In the embodiment shown, the aperture 50 is disposed at a position adjacent the fins. That is, the arrangement in that embodiment is such that the reinforcing elements on the tail reinforcing zone 22 are disposed only on the tail region 16. In that embodiment the reinforcing element 24, 34 turns to extend from the deck to the bottom through the angled aperture 50 from one side to the other (deck to bottom) just outside the tail region 16, the latter being where one foot of the rider stands in a normal riding position. The aperture 50 is straight.

The reinforcing element 24, 34 takes a curved path along the blank 11, following a similar pathway as that of the rail 13, 15, and is spaced a distance therefrom.

In the embodiment shown, there is a single reinforcing element 24 being its port side and 34 being its starboard side, is provided, either integral or connected (joined) at the nose end.

It can be seen that a single reinforcing element is provided in the drawings, (either integral or in pieces, connected together), the reinforcing element having one end being disposed on the deck in a left corner near the tail, the reinforcing element extending along a curved pathway along the port side rail 13 of the board, spaced a selected distance from the midline and from the port side rail 13, extending through angled aperture 50, from deck to bottom, and thence towards the nose region 18, and then returning along a similar path along the starboard side rail 15.

The reinforcing element forms a reinforcing zone by having two spaced reinforcing tape element portions 24, 34 spaced apart from one another and adjacent or a little spaced from, the rails 13, 15.

The reinforcing elements may be spaced from the midline of the blank but also spaced from the rail, depending on the amount of twist and resistance to twist required. The reinforcing elements may also be spaced from the nose, depending on the amount of resistance to bending forces required from the board. The reinforcing elements may be spaced from the midline of the blank.

Figure 2:
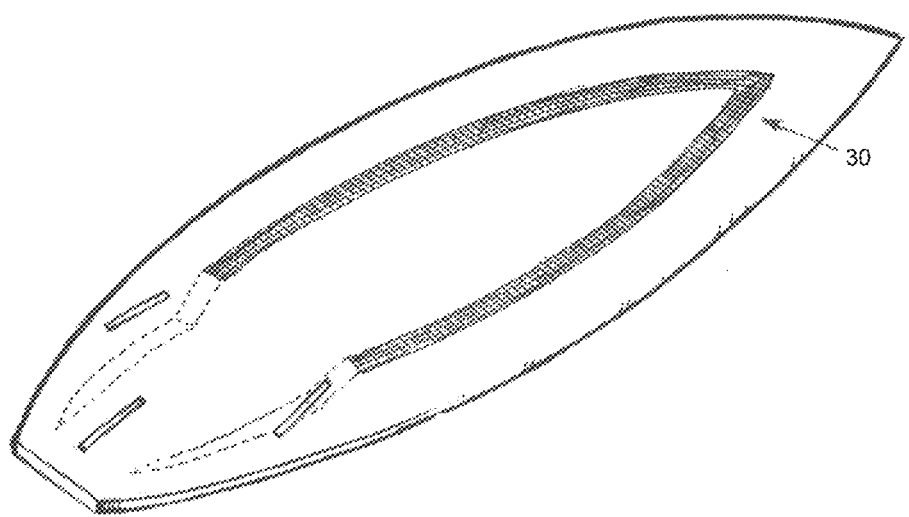
FIG. 2 is an isometric view of the board of FIG. 1 from underneath.
Figure 3:
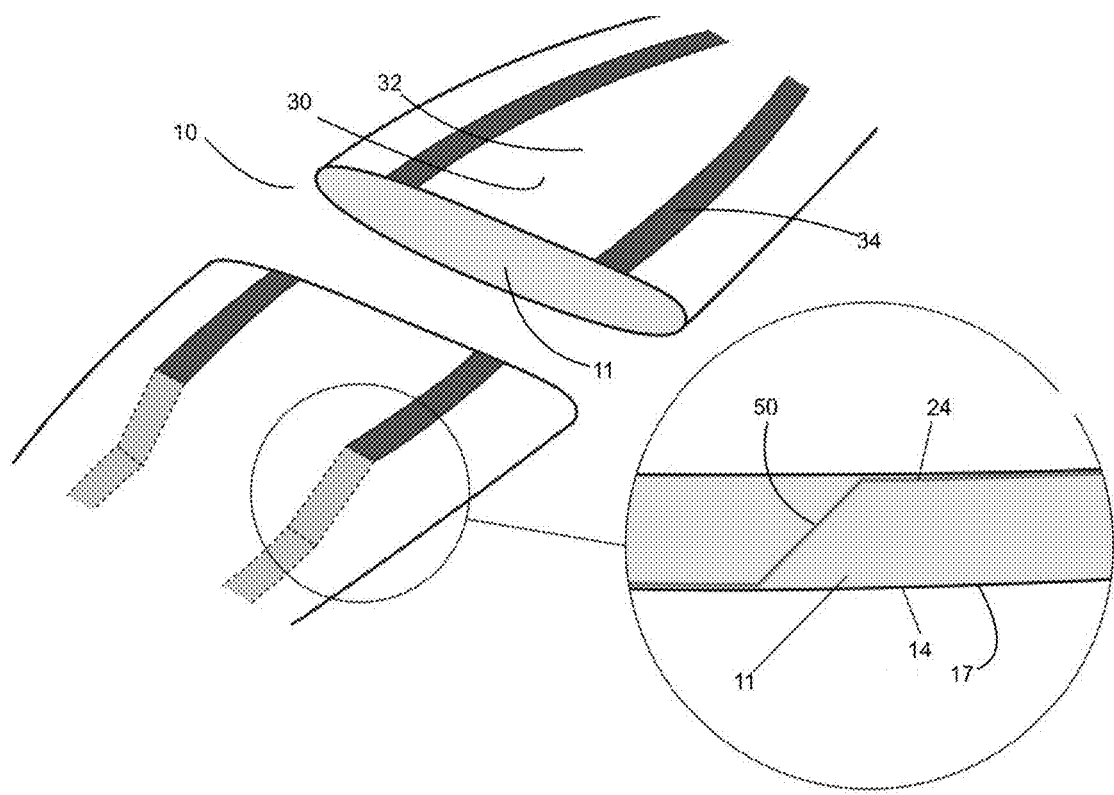
FIG. 3 is an isometric view of the board of FIG. 1 with a detail section view for additional clarity of the aperture and the injection of the reinforcing element into and through the board from one side to the other (deck to bottom)
Figure 4:
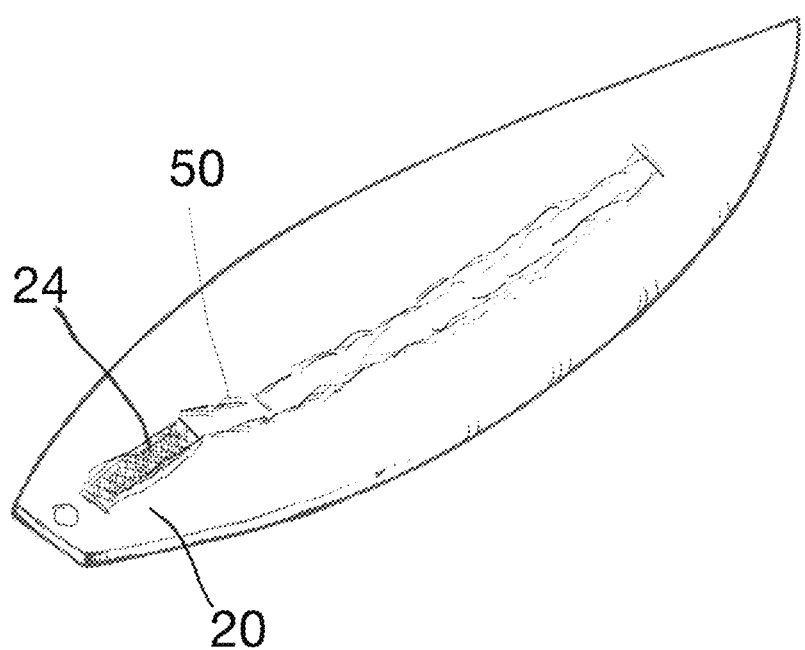
FIG. 4 is an isometric view of the board shown from the deck, with a reinforcing tape disposed on a centreline of the board, but passing through an aperture between deck and bottom, the aperture being angled, and at an intermediate point from tail to nose.

An alternative embodiment is shown in FIG. 4 where the reinforcing element 24 is not spaced from the milline of the blank, but is disposed along the centreline of the blank. Apart from that distinction, the tape and interconnecting reinforcing elements are the same as those shown in the other embodiment of FIGS. 1 to 3. That is, the reinforcing tape element 24 extends from a deck reinforcing zone 20 at the tail (tail reinforcing zone 22), along the deck from the tail, through the aperture 50 and along the bottom surface to the nose.

Figure 5:
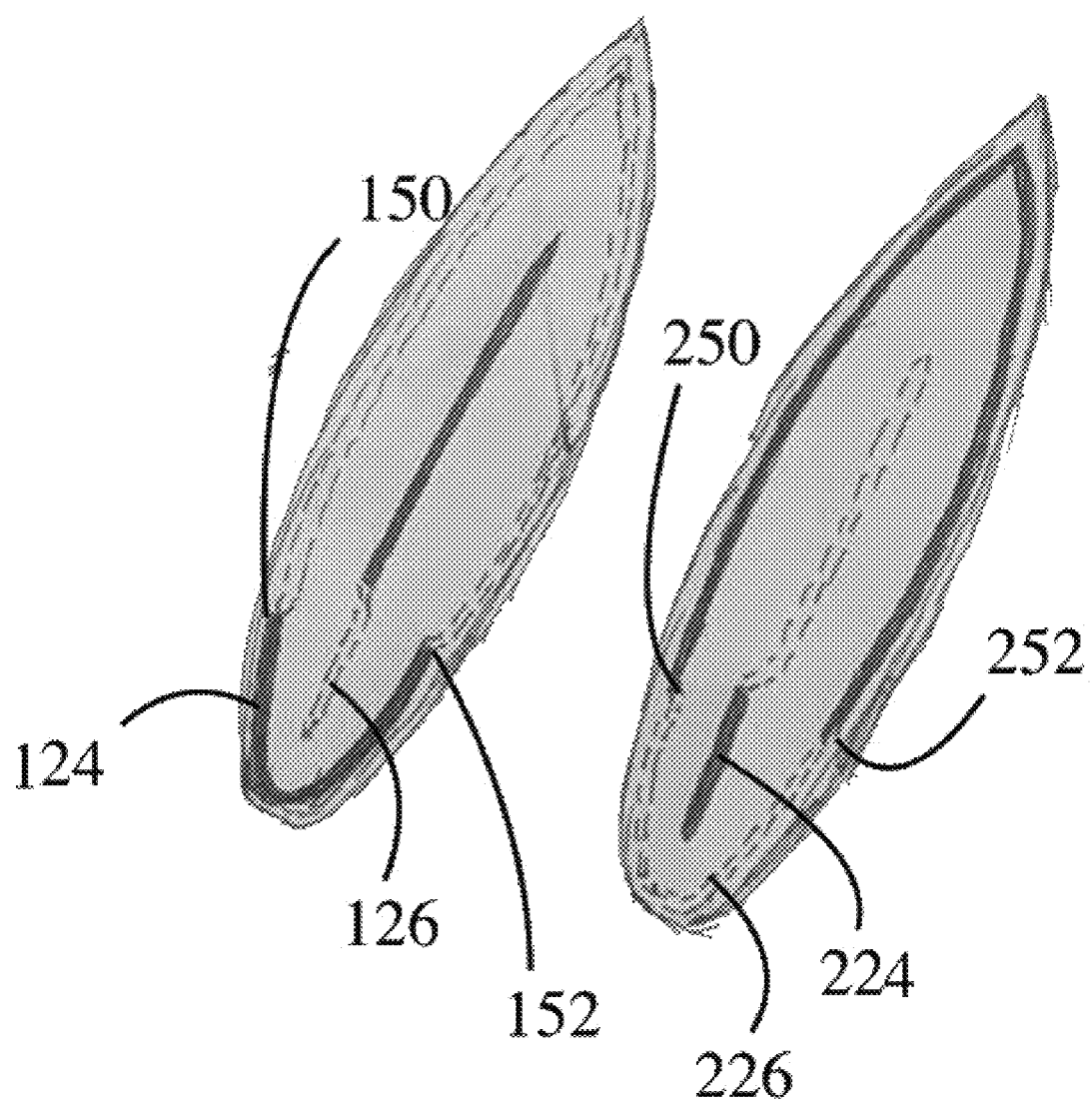
FIG. 5 shows two isometric views, which are top isometric views, where there is a sandwich reinforcing arrangement structure.
Figure 6:
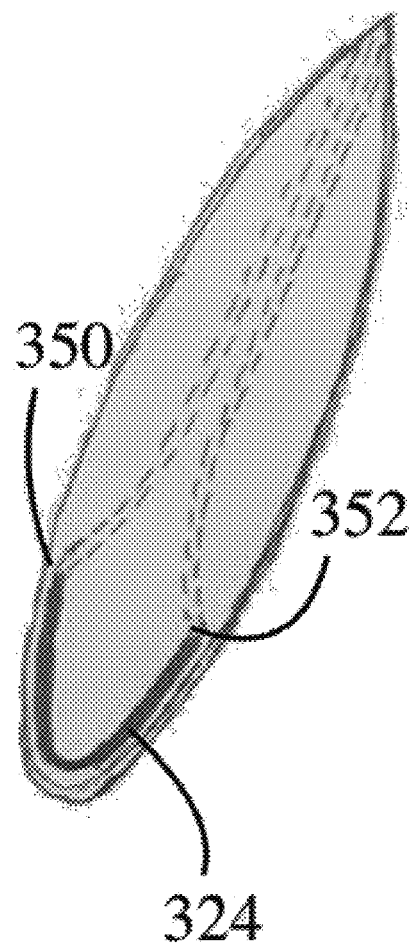
FIG. 6 shows a tail deck reinforcing region provided by a tape curving around the tail rail, and then extending through the blank to the bottom, the tape then curving asymptotically toward the midline at the nose.

Further alternative embodiments are shown in FIGS. 5a, 5b and 6.

First, FIG. 5a shows a sandwich reinforcing arrangement where, in the tail region, a tail reinforcing zone is provided by a reinforcing tape element portion 124 disposed on the deck surface, around the tail rail, and a reinforcing tape element portion 224 disposed on the bottom face near the tail.

Tape element portion 124 then extends through two apertures 150, 152, disposed adjacent the rail, near the tail, in the blank, and through to the bottom face, and forward to the nose region, where they join on the midline.

Tape element portion 126 extends from the tail region on the bottom surface midline, through the apertures 150, 152 in the board to the deck, and then extends along the midline to the forward region.

The arrangement provides additional stiffness, since there is a sandwich arrangement, wherein two tape elements are disposed on opposed sides substantially along the whole length of the board.

The arrangement in FIG. 5b is essentially a mirror image of FIG. 5a, where the deck reinforcing tape element 224 is disposed on the bottom, and vice versa.

In FIG. 6, a tail reinforcing region is shown, essentially as in FIG. 5a, the difference being that the tape element 324 extends through the deck to the bottom surface in two places near the tail rails, and then asymptotically extends toward the midline along to the forward region. There is no second tape element in FIG. 6.

Construction

To construct the reinforced board, there are similar steps taken to those of conventional boards, apart from the aperture 50, which is formed by cutting or slicing, or by, as mentioned above, assembly of blocks or pieces of the blank.

A slot 50 is cut into the board at an acute angle.

The slot could be cut into the board by a laser or other cutting tool. In one embodiment of the technology, the slot is cut by a blade (not shown) which is mounted in a jig or a fixture, so that the blade can cut a slot in the blank.

The reinforcing tape element 24 is laid on the deck or bottom face, pressed through with a blade (not shown). The blade again mounts in the jig or fixture so that it presses through the board into the aperture 50 at substantially the same angle as the aperture, and then emerges on the other side to be laid on that other, opposite face. Then, as in the known manner, a resin-injected weave is laid on the blank, or as otherwise known to seal the board and protect it from damage, and provide a certain membrane strength to the blank.

The reinforcing element, and indeed the entire board, may be printed on the board, by a 3-D printer, either so that the reinforcing element solidifies onto a third reinforcing element, and sets, or the entire reinforcing element is printed onto the surface, injected (or printed) through the aperture and then cured or allowed to set in place on the board. This allows a greater flexibility of construction techniques and types and shapes of reinforcing material.

The blank itself may be printed by a 3D printer, with one head or machine, while the reinforcing element itself may be printed with another printer or head.

Modifications and improvements to the invention will be readily apparent to those skilled in the art. Such modifications and improvements are intended to be within the scope of this invention.

The claims defining the invention are as follows:

1. A board or watercraft which includes:
   one or more deck reinforcing zones disposed in or on a deck, and one or more bottom reinforcing zones disposed in or on a bottom face, the deck reinforcing zone and bottom reinforcing zones including one or more elements of reinforcing material disposed on or in a face of the deck and bottom,
   wherein the deck reinforcing zone and the bottom reinforcing zones are interconnected by an interconnecting reinforcing element extending through the board or watercraft or vessel between the deck and the bottom, and wherein at a selected point between tail and nose, an aperture is provided between the deck and the bottom, to allow the interconnecting reinforcing material to extend from one face to another.

2. The board or watercraft in accordance with claim 1 wherein the one or more elements of reinforcing material are connected together by the interconnecting reinforcing element.

3. The board or watercraft in accordance with claim 1 wherein the one or more reinforcing zones are disposed on the midline of the board.

4. The board or watercraft in accordance with claim 1 wherein the one or more reinforcing zones are disposed distal the midline of the board.

5. The board or watercraft in accordance with claim 1 wherein one reinforcing zone is disposed on the midline, and an interconnected reinforcing zone is disposed on an opposite face distal the midline of the board.

6. The board or watercraft in accordance with claim 1 wherein the blank and/or the reinforcing material is covered by a resin layer and/or a glass fabric layer for supplementary structural support.

7. The board or watercraft in accordance with claim 1 wherein the reinforcing material is rods or rovings, straps, battens.

8. The board or watercraft in accordance with claim 1 wherein reinforcing material is in the form of webbing or tape elements.

9. The board or watercraft in accordance with claim 1 wherein the elements of reinforcing material are integral with the interconnecting reinforcing element.

10. The board or watercraft in accordance with claim 9 wherein the tape element is carbon fibre webbing or tape.

11. The board or watercraft in accordance with claim 1 wherein the aperture extends generally at an acute angle, from the deck to the bottom face to reduce stresses on the reinforcing element or blank.

12. The board or watercraft in accordance with claim 1 wherein the aperture extends through the board on a curved path.

13. The board or watercraft in accordance with claim 1 wherein the reinforcing element extends from the tail region of the board to the nose region of the board along a curved path.

14. The board or watercraft in accordance with claim 1 wherein the board includes one, two, three, four, five, six, seven, eight, nine, or ten reinforcing elements which may be laterally spaced-apart across the board.

15. The board or watercraft in accordance with claim 1 wherein the reinforcing tape elements are 1, 2, 3, 4, 5, 6, 7, 8, 9, 10, 15, 20, 25, 30, 35, 40, 45, 50, 55, 60, 65, 70, 75, 80, 85, 90 or 100 mm wide.

16. The board or watercraft in accordance with claim 1 wherein one reinforcing element extends from deck to bottom, while other reinforcing elements may extend from bottom to deck in the same board region, providing a sandwich effect where there are one or more deck reinforcing zones and one or more bottom reinforcing zones in the same board region.

17. The board or watercraft in accordance with claim 1 further including two or more reinforcing elements, joined together at the nose and/or the tail.

18. A method of manufacture of a board or watercraft, the method including the steps of:
  providing a board blank;
  cutting an aperture between a deck and a bottom face;
  threading a reinforcing element through the aperture;
  fastening the reinforcing element to, or in, the deck and bottom face.

19. A method of manufacture of a board or watercraft, the board or watercraft having a deck and a bottom, the method including the steps of:
  printing a reinforcing element onto a board blank, the reinforcing element extending from the deck of the board to the bottom of the board.

* * * * *